United States Patent [19]

Iverson

[11] 4,114,477

[45] Sep. 19, 1978

[54] REVERSIBLE POWER TRANSMISSION

[76] Inventor: Roger A. Iverson, 8469 Everett Way "A", Arvada, Colo. 80005

[21] Appl. No.: 733,480

[22] Filed: Oct. 18, 1976

[51] Int. Cl.² .......................... F16H 57/10; F16D 7/02
[52] U.S. Cl. .................................. 74/768; 74/750 R; 74/606 A; 64/30 C
[58] Field of Search .................... 74/768, 769, 750 R, 74/753, 606 A; 64/30 C

[56] References Cited

U.S. PATENT DOCUMENTS

| 1,734,406 | 11/1929 | Strand | 74/606 A |
| 2,682,789 | 7/1954 | Ochtman | 74/768 |
| 2,756,614 | 7/1956 | Kobayashi | 74/606 A |
| 2,868,037 | 1/1959 | Hindmarch | 74/768 X |
| 3,092,983 | 6/1963 | Huber | 64/30 C |
| 3,105,371 | 10/1963 | Forrest | 64/30 C |
| 3,136,180 | 6/1964 | Sprague et al. | 74/768 |
| 3,353,591 | 11/1967 | Zak | 74/606 A X |
| 3,436,986 | 4/1969 | Lawrence | 74/768 |
| 4,023,640 | 5/1977 | Frazee et al. | 64/30 C X |

*Primary Examiner*—Samuel Scott
*Assistant Examiner*—Lance W. Chandler
*Attorney, Agent, or Firm*—Richards, Harris & Medlock

[57] ABSTRACT

A reversible power transmission having a pair of axially spaced selectively actuable brakes each including fixed stator disks and rotor disks. Two ring gears each have gear teeth on inner and outer surfaces with the outer teeth enmeshed with inner teeth on the rotor disks. An input shaft carries a driving sun gear. An output shaft is aligned with the input shaft. A cage carried by the output shaft has two arrays of idler pinion gears journaled in the cage with the first array driven by the sun gear and driving the second array. Each pinion of the first array is enmeshed with teeth on the inside of one of the ring gears, and each pinion of the second array is enmeshed with teeth on the inside of the other ring gear.

10 Claims, 4 Drawing Figures

REVERSIBLE POWER TRANSMISSION

BACKGROUND AND SUMMARY OF THE INVENTION

This invention relates to a power transmission, and more particularly to a reversible, variable speed, power transmission.

In construction machinery and in recreational units such as off road vehicles, there is need for a reversible power transmission with variable speed control. Often such vehicles are slow moving (9-21 mph) and must be towed to the area of use, which may cause damage to the gear train.

The present invention comprises a novel transmission useful in construction machinery and recreational vehicles. In accordance with the present invention, a power transmission has a pair of axially spaced, selectively actuable brakes each including fixed stator disks and rotor disks. Two ring gears each having gear teeth on the inner and outer surfaces with the outer teeth enmeshed with the inner teeth on the rotor disks. An input shaft carries a driving sun gear. An output shaft is aligned with the input shaft. A cage carried by the output shaft has two arrays of idler pinion gears journaled in the cage with the first array driven by the sun gear and driving the second array. Each pinion of the first array is enmeshed with teeth on the inside of one of the ring gears, and each pinion of the second array is enmeshed with teeth on the inside of the other ring gear.

BRIEF DESCRIPTION OF THE DRAWINGS

For a more complete understanding of the present invention and for further objects and advantages thereof, reference may now be had to the following descriptions taken in conjunction with the accompanying drawings in which.

DESCRIPTION OF A PREFERRED EMBODIMENT

Figure 1:
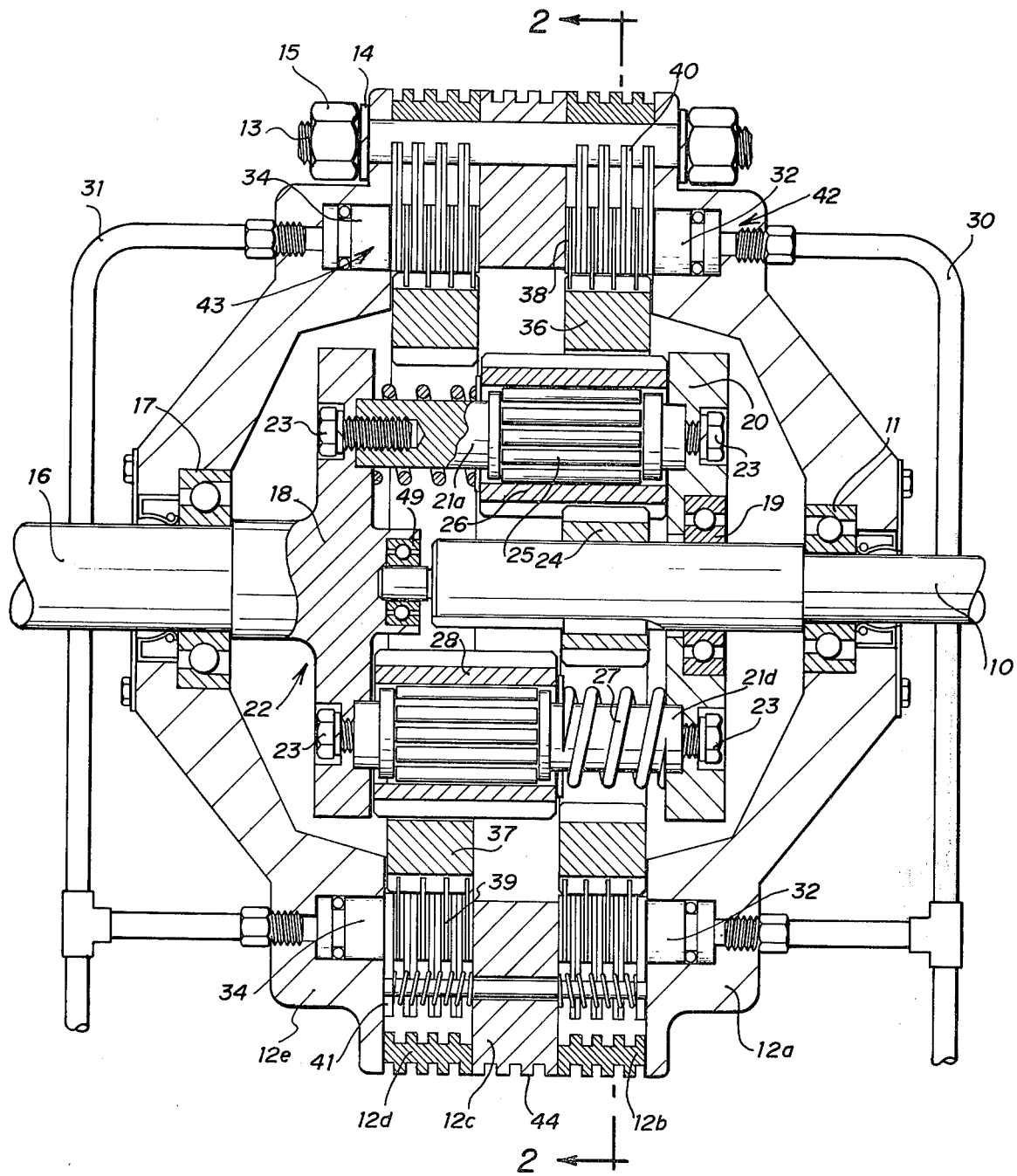
FIG. 1 is a side sectional view taken along line 1—1 of FIG. 2.
Figure 2:
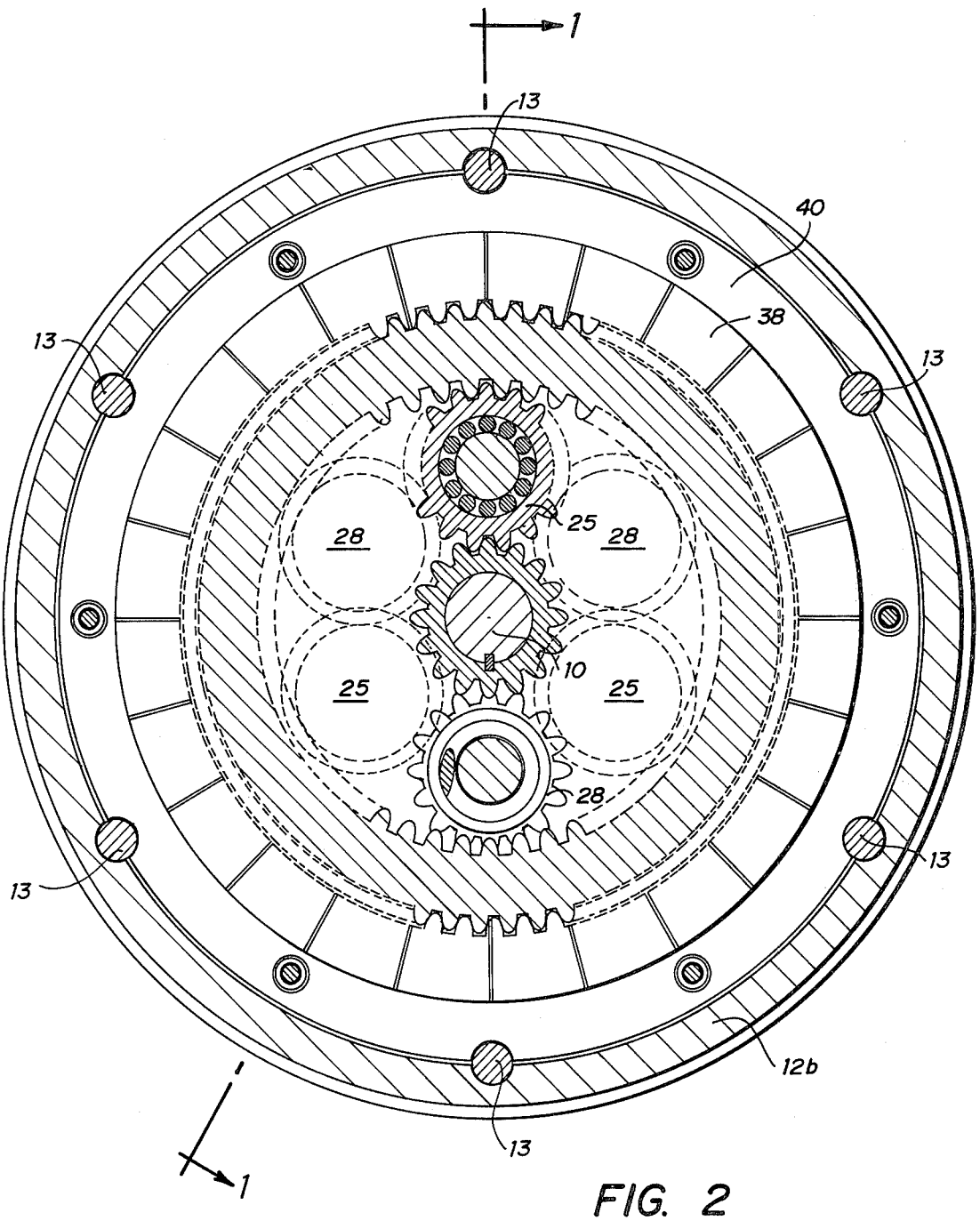
FIG. 2 is an end sectional view taken along line 2—2 of FIG. 1.

Referring to FIGS. 1 and 2, a transmission is provided in which an input shaft 10 is provided for driving mechanisms inside housing 12 for selective rotation of the output shaft 16 in either direction at a preselected gear ratio.

Shaft 10 is journaled in bearing 11, mounted in end plate 12a of housing 12. Housing 12 is made up of two end plates 12a and 12e and two ring members 12b and 12d that are grooved on both the inner and outer periphery and an additional ring member 12c which is smooth on the inner periphery and grooved on the outer periphery. The grooved surfaces serve to dissipate heat in the housing. Housing members 12a-12e are secured together by means of bolt 13, lock washers 14 and nuts 15. Bolt 13 extends into the interior cavity of the housing 12 for a purpose which will later be described. Shaft 16 is journaled in bearing 17 mounted in end plate 12e of housing 12. Shaft 16 extends into the interior of housing 12 and is connected to a carriage face plate 18. Shaft 10 is journaled in bearing 19 mounted in carriage face plate 20. Shafts 10 and 16 have a common center line. Pilot bearing 49 is mounted in the interior face of plate 18. Shaft 10 is journaled in bearing 49. This feature assures proper alignment of shafts 10 and 16 while allowing them to rotate independently of each other. Plates 18 and 20 are joined by means of six shafts 21a-21f spaced equidistant around the face plates 18 and 20. Two of the shafts, the shafts 21a and 21d are shown in FIG. 1. Face plates 18 and 20 are fastened to shafts 21a-21f by means of bolts 23 which are served into shafts 21a-21f. Plates 18 and 20, rods 21 and bolts 23 make up a rigid carriage 22. Carriage 22 is rigidly fastened to shaft 16 through face plate 18. Bearing 19 enables carriage 22 and shaft 16 to rotate freely, in the same direction or the opposite direction, with respect to shaft 10.

Sun gear 24 is keyed or spined on the end of shaft 10 that intrudes into housing 12. Needle bearings 25 slide axially over shafts 21a-21f. Pinion gear arrays 26 and 28 slide axially over bearings 25. Bearings 25 and pinion gear arrays 26 and 28 are held in their proper positions by springs 27 which are axially slidable over shafts 21.

Ring piston 32 is contained in a groove on the inner surface of housing end plate 12a. Likewise ring piston 34 is contained in a groove on the inner surface of housing end plate 12e. Fluid pressure for piston 32 is provided through fluid line 30. Pressure for piston 34 is provided through fluid line 31. The functions of pistons 32 and 34 will be later disclosed.

Input shaft 10 transmits torque to the planetary gear train through sun gear 24. Sun gear 24 is enmeshed with three pinion gears of array 26. The gears are spaced equidistant around sun gear 24. Because FIG. 1 is a sectional view, only one pinion gear of array 26 is shown. Pinion gear array 26 overlaps and is enmeshed with an opposing array 28 of three pinion gears. In FIG. 1, only one pinion gear of array 28 is shown. Pinion gear array 26 is also enmeshed with a ring gear 36 which is toothed on both the inner and outer periphery thereof. Likewise pinion gear array 28 is enmeshed with a ring gear 37 which also is toothed on the inner and outer peripheries. Ring gear 36 is enmeshed on the outer periphery with a multiplicity of rotor disks 38 which are axially slidable over the teeth of ring gear 36. Likewise ring gear 37 is enmeshed on the outer periphery with a multiplicity of rotor disks 39 which are axially slidable over the teeth of ring gear 37. Rotors 38 are separated by stator rings 40. Stator rings 40 are notched at the outer periphery to receive bolts 13 thereby preventing rotational movement of stator rings 40 relative to the housing 12. Similarly, rotor disks 39 are separated by a multiplicity of stator rings 41. Stator rings 41 are also notched to receive bolts 13.

Pistons 32 and 34, selectively actuated, apply pressure to the stator rings 40 and 41, respectively, and to the rotor disks 38 and 39. With no pressure applied to line 30 or line 31, the transmission is in a "free" state. Torque input on shaft 10 during the free state is transmitted from shaft 10 to the two pinion gear arrays 26 and 28 through sun gear 24, which will transmit the torque to ring gears 36 and 37. Ring gears 36 and 37 will apply torque to the rotor disks 38 and 39. Ring gears 36 and 37 and rotor disks 38 and 39 will be free to rotate. If pressure is applied to line 30, piston 32 will apply pressure to compress the stack of stator rings 40 and rotor disks 38. Pressure produced by piston 32 will hold rotor disks 38 and will not allow them to rotate. Because rotor disks 38 are enmeshed with the teeth on ring gear 36, rotor disks 38 will arrest ring gear 36. In this state, torque applied to the input shaft 10 is transmitted through sun gear 24 to the two arrays of pinion gears 26 and 28. Since rotor disks 38 and ring gear 36 are unable to rotate, the first array of pinion gears 26 is forced to track around the inner periphery of ring gear 36, thus turning carriage 22 which causes a rotational output on shaft 16. This output rotation will be in the same direction as the input. Ring gear 27 and rotor disks 39 are still free to rotate.

When pressure is applied to line 31, piston 34 will apply pressure to stator rings 41 and rotor disks 39. This pressure will arrest rotation of rotor disks 39 and in turn rotor disks 39 will arrest ring gear 37. When a torque is applied to input shaft 10, it will be transmitted through sun gear 24 to the first array 26 of pinion gears which will transmit the torque to the second array 28 of pinion gears. Since the rotor disks 39 and the ring gear 37 are unable to rotate, the second array of pinion gears 28 is forced to track around the inner periphery of ring gear 37 thus causing carriage 22 to rotate resulting in an output rotation on shaft 16. With pressure applied to line 31, the rotation of output shaft 16 is in direction opposite the rotation of input shaft 10.

More precisely, rotor disks 38 and 39, stator rings 40 and 41, and ring pistons 32 and 34 function together to make up two independent brakes 42 and 43. These brakes 42 and 43 may be used to vary the speed of the rotational output by the amount of pressure supplied on lines 30 and 31. Heretofore reference has only been made to define pressure to lines 30 and 31 to cause a total lock-up of the brakes 42 and 43, or no pressure is applied to either line 30 and 31 allowing ring gears 36 and 37 to rotate freely resulting in no rotational output. When partial pressure is applied to line 30, piston ring 32 is partially activated applying pressure to stator ring 40 and rotor disks 38 somewhat retarding the rotation of rotor disks 38. When a torque is input on shaft 10, it is applied to the first array of pinion gears 26 through sun gear 24. Torque is then transmitted from pinion gear array 26 to ring gear 36. Since rotor disks 38 and stators 40 have a given amount of pressure supplied to them, their rotational speed is reduced. When pinion gear array 26 applies torque to ring gear 36 which is enmeshed with rotor disks 38, the ring gear 36 and rotor disks 38 are forced to rotate but at a slower speed than that of the "free" state. Due to the reduced rotational speed of ring gear 36 and rotor disks 38, pinion gear 26 is forced to track around the inner periphery of ring gear 36. Due to the rotation of ring gear 36 and rotor disk 38, the speed at which the pinion gear array 26 tracks around the inner periphery of ring gear 36, and turns the carriage is reduced, the amount depending on the amount of pressure applied on line 30. The same holds true if partial pressure is applied to line 31, only the resulting rotation is opposite to that of the input.

Another novel feature of the present invention is the fact that the gear train is totally enclosed and sealed by an outer housing 12. Housing 12 has rib surfaces on housing members 12b, 12c and 12d for structural stability and heat transfer. The ribs 44 act as heat exchange fins to transfer the heat build up inside the housing 12 directly to the atmosphere. Inside housing 12 is limited amount of oil. This oil bath is mixed and circulated throughout the interior of housing 12 by the rotation of moving parts. The oil is then forced through the areas where local heat build up is prevalent to carry this heat away to the walls of housing members 12a-12e. The two brakes 42 and 43 throw the oil passing over the rotor disks 38 and 39 and the stator rings 40 and 41 onto the ribs of housing members 12b and 12d. The heat passes through housing members 12b and 12d to the outside atmosphere. The oil then circulates through various passages to return to the center portion of the gear train. This oil is splashed by the motion of the rotating members to mix and froth throughout the inside of housing 12. This constant agitation serves to further cool the oil bath by contact with the housing surfaces.

Figure 3:
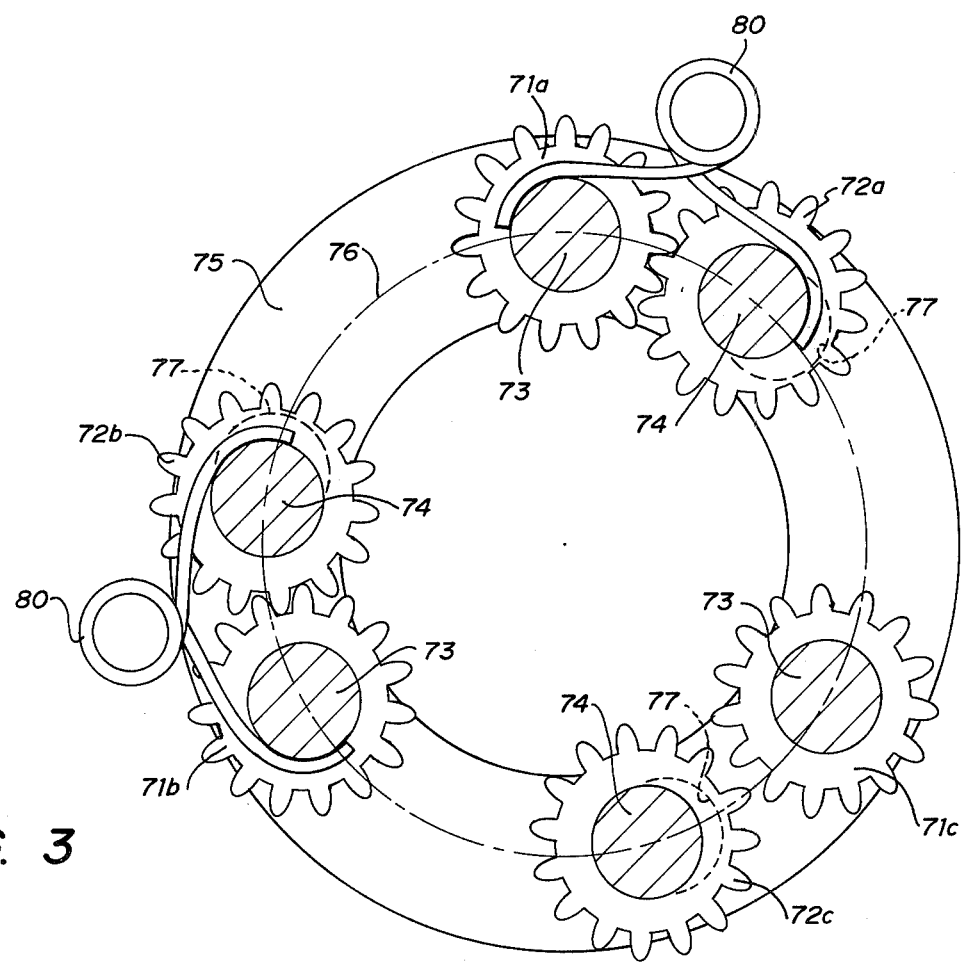
FIG. 3 is an end view illustrating a modified arrangement of the pinion gearing.

Now referring to FIG. 3, shown is an end view of the mesh of pinion gear arrays 71 and 72. These gears center on a common circumference 76 on the support plate 75. Pinion shafts 73 of the first pinion gear array 71 are fixed in plate 75. The first array of pinion gears 71 on shafts 73 rotate due to their engagement with sun gear and ring gear (not shown). The interaction between these gears (sun-pinion-ring) forces plate 75 to rotate. Each member of the first pinion gear array 71 is meshed to a corresponding member of a second pinion gear array 72. Array 72 is for reverse rotation from that of array 71. The mesh of these two arrays 71 and 72 is maintained by springs 80. Slots 77 are divided in plate 75 for shafts 74 of the second pinion gear array 72. Slots 77 have a two fold purpose. First, to accommodate for the unequal thermal expansion of dissimilar metals, and second, to provide for the disengagement of the two arrays 71 and 72 when springs 80 are removed or a stretch block is forced between the pinion shafts 73 and 74.

A potentially acute problem with compound gear trains is proper clearance and alignment. Tight fits of mesh gears at one end of the gear train magnify linearly along the gear train causing interference at the other end. This interference action seriously deteriorates the performance and life of the gears. Thermal expansion serves to accelerate this effect.

A portion of the problem is greatly relieved via the slots 77. The gears are properly aligned on the circumference 76, and proper mesh is maintained through springs 80. However, the pinion shafts 74 are free to subtend an arc when the pinion gear arrays 71 and 72 grow due to thermal expansion.

Off-road vehicles in particular are relatively slow moving (9-21 mph). Often times it is desirable to tow the vehicle in moving from one work site to another especially if the distance between is far. One problem with towing vehicles is the heat build up in components such as the above-mentioned transmission. Another problem is braking capacity for slowing and stopping the vehicle.

The slots 77 are sufficiently wide to permit the pinion gear arrays 71 and 72 to unmesh. This feature of disengagement effectively releases the two opposing planetary systems from the integrated action mentioned throughout this disclosure. However, when both brakes are activated in unison, the pinions are free to rotate without interference or clashing. Thus, the unit acts as a very effective brake against output shaft rotation.

Figure 4:
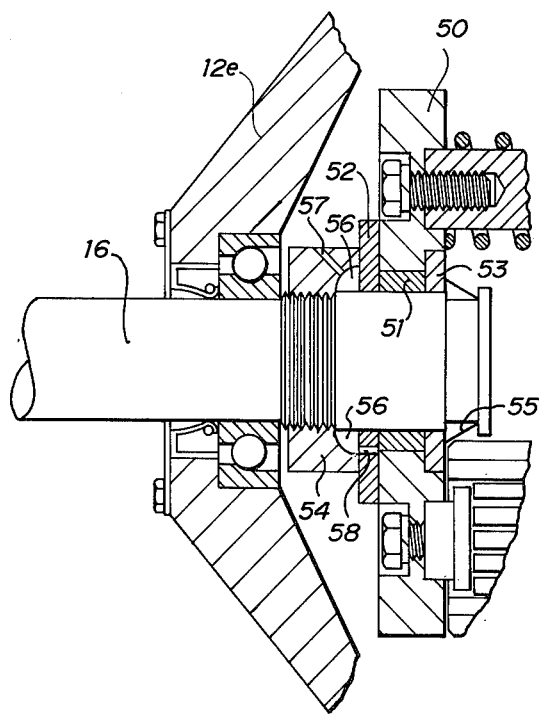
FIG. 4 is a detailed sectional view of a torque limiter.

Now referring FIG. 4, shaft 16 can be adapted to incorporate a torque limiter 60. Torque limiter 60 is for safety in preventing the gear train from being overstressed due to shock loading. Disk 50 is a support for shafts 21a-21f. The tracking of pinion gear arrays 26 and 28 around the inner periphery of ring gears 36 and 37 forces disk 50 to rotate. Disk 50 is fitted onto a bearing 51 which in turn is press fit onto shaft 16. Two friction disks 52 and 53 are also fitted onto shaft 16. Disks 52 and 53 are spaced one on each side of disk 50. Disks 50, 52 and 53 are held in place by a threaded lock plate 54 and a tension spring 55. The unit is designed to slip depending upon the tension put on spring 55. This tension is adjustable by the number of turns on the threaded lock plates 54. When shock loadings are sufficiently large, the unit will slip. The slippage prevents overloading of the bearing and gear teeth in the gear box.

A further advantage of the torque limiter 60 is the heat transfer system which comprises a reservoir 56 located between the locking plate 54 and the shaft 16. Oil is contained in reservoir 56 for lubrication and cooling to prevent the unit from overheating when slippage commences. Circulation is accomplished through ports 57 and 58. Disk 50 generates heat and creates pressure drop in reservoir 56. This pressure drop is sufficient to pull oil foam through port 57. Once the oil is pulled into reservoir 56 it flows out through channeled holes 58 in the friction disk 52 and over the face of disk 50 where heat is being generated. The oil carries this heat into the main body of the oil bath preventing the torque limiter from overheating.

Having described the invention in connection with certain specific embodiments thereof, it is to be understood that further modifications may now suggest themselves to those skilled in the art and it is intended to cover such modifications as fall within the scope of the appended claims.

What is claimed is:

1. A reversible power transmission comprising:
   (a) a cylindrical housing having a pair of axially spaced brakes each including a set of stator disks and a set of rotor disks with hydraulic means for selectively actuating said brakes,
   (b) two ring gears each having gear teeth on inner and outer surfaces thereof with the outer teeth enmeshed with inner teeth on said rotor disks,
   (c) an axial input shaft extending into one side of said housing carrying a driving sun gear,
   (d) an output shaft aligned with said input shaft extending from said housing on the other side thereof,
   (e) a cage carried by said output shaft, and
   (f) two arrays of idler pinion gears journaled in said cage with a first of said arrays driven by said sun gear and driving the second of said arrays and with each pinion of said first of said arrays enmeshed with teeth on the inside of one of said ring gears and with each pinion of the second of said arrays enmeshed with teeth on the inside of the other of said ring gears.

2. The combination set forth in claim 1 wherein:
   (a) said housing is partially filled with a coolant liquid and wherein the inner surface of said housing is circularly ribbed for extended surface exposure to said liquid for heat transfer enhancement.

3. The combination set forth in claim 1 wherein:
   (a) the length of said housing parallel to its axis slightly excedes the sum of the width of one of said ring gears plus the length of one of said pinion gears, such that the toothed end of each of said pinion gears is enmeshed with one of said ring gears and bears against the said opposing ring gear to fix the axial spacing of said ring gears and said pinion gears.

4. The combination set forth in claim 1 wherein:
   (a) a torque limiter connects said carriage to said output shaft, to guard against excessive stress on said gears when high torque is applied to said input shaft or when a non-yielding structure is connected to said output shaft.

5. The combination set forth in claim 1 wherein:
   (a) said housing is partially filled with a coolant liquid and wherein the inner surface of said housing is circularly ribbed for extended surface exposure to said liquid for heat transfer enhancement; and
   (b) a torque limiter connects said carriage to said output shaft, to guard against excessive stress on said gears when high torque is applied to said input shaft or when a non-yielding structure is connected to said output shaft.

6. The combination set forth in claim 1 wherein:
   (a) the length of said housing parallel to its axis slightly excedes the sum of the width of one of said ring gears plus the length of one of said pinion gears, such that the toothed end of each of said pinion gears is enmeshed with one of said ring gears and bears against the said opposing ring gear to fix the axial spacing of said ring gears and said pinion gears; and
   (b) a torque limiter connects said carriage to said output shaft, to guard against excessive stress on said gears when high torque is applied to said input shaft or when a non-yielding structure is connected to said output shaft.

7. The combination set forth in claim 1 in which said cage comprises a pair of disks, one of which is mounted to said output shaft.

8. The combination set forth in claim 7 wherein said disks are rigidly interconnected and spaced apart by shafts on which the idler pinions of said two arrays are freely rotatable.

9. The combination set forth in claim 8 in which means are provided for maintaining one of said ring gears adjacent one of said disks and for maintaining the other of said ring gears adjacent to the other of said disks.

10. The combination set forth in claim 1 in which said ring gears occupy about two-thirds of the width of said cage and are positioned at opposite sides thereof with a spare therebetween in which pinions of one of said arrays overlap the pinions of the other of said arrays.

* * * * *